United States Patent Office 3,131,082
Patented Apr. 28, 1964

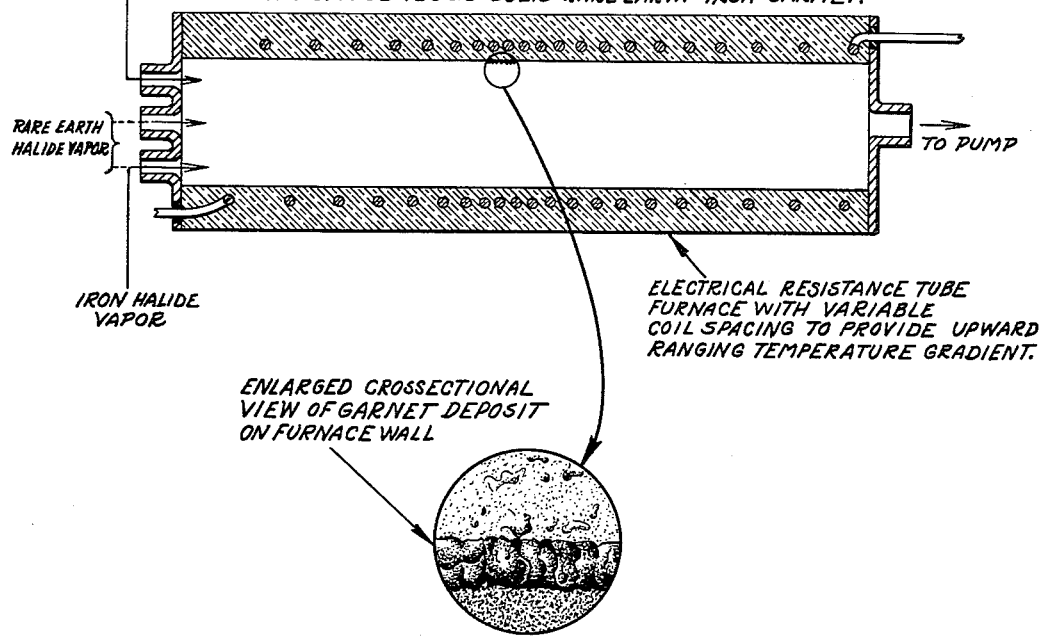

3,131,082
RARE EARTH-IRON GARNET PREPARATION
John R. Gambino, Scotia, N.Y., assignor to General
Electric Company, a corporation of New York
Filed Feb. 1, 1962, Ser. No. 170,484
11 Claims. (Cl. 117—49)

This invention pertains generally to the preparation of novel rare earth-iron garnet compositions. More particularly, the invention pertains to the direct preparation of a solid homogeneous phase of polycrystalline rare earth-iron garnet possessing ferromagnetism along with other highly desirable properties. Additionally, the invention pertains to a novel method for vapor depositing the iron garnet utilizing gas phase reactions of certain volatile compounds of the metals in the garnet composition.

It has been the endeavor of investigators to prepare a polycrystalline rare earth-iron garnet exhibiting ferromagnetic properties approaching that for a single crystal of the material. These efforts have been unsuccessful by reason of the presence in the deposit of large voids, byproducts, crystal faults, and other irregularities which degrade the desired properties and render the deposit highly unsuitable for many applications. Furthermore, conventional methods for depositing a polycrystalline rare earth-iron garnet film all utilize distinct individual preparation steps which complicate the preparation besides making such methods expensive and inefficient. Known methods for ferrite film preparation include sputtering in argon and oxygen atmospheres, pyrolytic spraying of metal organic complexes and vacuum evaporation of alloys. Conceivably, these methods might be utilizable for rare earth-iron garnet preparation, but all include further thermal heat treatment and oxidation of the deposited material. The thermal treatment associated with such conventional processes consists of a heating operation to reduce the proportion of voids in the deposit by way of coalescing the individual particles into a unitary mass at temperatures above the sintering temperature for the garnet composition. The treatment often produces opposite results due to ferric oxide dissociation in the composition whereby oxygen is evolved and the porosity of the deposit actually increases. The oxidation step employed for converting the deposited metals and sub-oxides to ferrite crystals comprises reaction with oxygen-containing atmospheres at elevated temperatures and has resulted in polycrystalline products with several types of imperfections including second phases and other crystallographic defects. The defects cause line broadening in the polycrystalline phase, thereby degrading the ferromagnetic properties of a deposit for the intended application. It would promote the wider acceptance of rare earth-iron garnet compositions in ferromagnetic applications generally if a homogeneous solid phase of the material could be deposited in layer or thin film form on a variety of different shapes and substrates with the deposit exhibiting substantially the same ferromagnetic properties as a single crystal of the composition.

It is one important object of the invention, therefore, to provide a method for depositing polycrystalline layers of the rare earth-iron garnet composition as a solid homogeneous phase exhibiting a crystallographic structure and ferromagnetic properties closely approximating that for a single crystal of the material.

It is still another important object of the invention to provide a method for the preparation of a homogeneous phase polycrystalline rare earth-iron garnet in layer form on a suitable substrate by direct conversion of particular volatile metal compounds.

It is still another important object of the invention to provide compositions of a polycrystalline homogeneous phase of rare earth-iron garnet having ferromagnetic properties.

Still another important object of the invention is to provide thin supported layers of a polycrystalline rare earth-iron garnet phase having ferromagnetic characteristics.

These and other important objects and advantages of the invention will be apparent from the following description.

Briefly, the invention is practiced by coprecipitating at least one rare earth oxide with iron oxide at sufficiently elevated temperatures for crystalline growth of the coprecipitate to form the particular crystalline iron garnet composition directly upon deposition as a homogeneous phase of small individual crystals. The crystals are grown to larger size by continued oxide deposition at temperatures below the sintering temperature of the composition. That the garnet structure can be obtained directly from deposition of the metal oxides is surprising in view of the complex crystalline structure of iron garnet compared to other ferrites and simpler crystal structures generally. Formation of a homogeneous iron garnet phase by direct deposition of the oxides is also surprising since conventional deposition methods uniformly produce polyphase deposits including some compositions giving no evidence of garnet structure whatsoever.

According to one preferred method of the invention, a homogeneous solid phase of rare earth-iron garnet is obtained by introducing rare earth halide and iron halide vapors jointly into a reaction chamber having an oxygen-containing atmosphere, thereafter converting the halide vapors with mixing to the oxide vapors, and coprecipitating the oxides to form the particular polycrystalline garnet composition upon deposition. In this preferred method, the oxides are coprecipitated on a heated substrate at elevated temperatures up to the sintering temperature for the deposit in an atmosphere of the depositing oxides so as to obtain further crystalline growth by continued deposition of the oxides. Heating the deposit to temperatures above the sintering temperature is avoided in order to minimize formation of the type crystalline faults obtained with conventional methods.

In another preferred method for obtaining a thin film polycrystalline iron garnet deposit in continuous fashion, a rare earth halide and an iron halide are converted to oxides in an oxygen-containing gas by introducing a continuous stream of the reactants into an open tubular reactor and coprecipitating the oxides on the wall of the reactor while passing any unreacted gases out the open end of the tube. The flow rates of the halide reactants to the tube may be maintained so as to provide a stoichiometric excess of iron halide to rare earth halide in the tube over that required for the respective 5–3 ratio in the final iron garnet composition. The stoichiometric excess promotes greater deposition efficiency as well as more homogeneous garnet formation generally. This preferred method is illustrated by the drawing which sets forth the steps of the method. The drawing also illustrates the tubular reactor with a garnet deposit on the walls thereof.

The invention is practiced in its preferred embodiments as illustrated in the following examples and subsequent discussions thereon. Where parts and percentages appear hereinafter in the specification and claims, the reference is to parts and percentages by weight unless otherwise specified.

EXAMPLE 1

Into a tubular reaction chamber of approximately ⅜ inch diameter and 4 inch length housed in a temperature gradient furnace there is admitted a mixture of yttrium chloride ($YCl_3$), ferric chloride ($FeCl_3$), and an oxygen-containing gas which had been preheated to approximately 850° C. A feed rate of yttrium chloride to the reaction chamber was established at approximately 1.04 grams per hour by volatilizing the solid material in a separate furnace and conducting yttrium chloride vapors to the reaction chamber in the oxygen-containing atmosphere which comprised a mixture of oxygen and argon flowing at rates of 200 standard milliliters per minute and 500 standard milliliters per minute, respectively. Likewise, a feed rate for the ferric chloride to the reaction chamber of approximately 2.91 grams per hour was established by heating the solid material in the same separate furnace used to volatilze the yttrium chloride and conducting the ferric chloride vapors to the reaction chamber in the same oxygen-containing atmosphere with the yttrium chloride vapors. The preheated gaseous mixture was reacted merely by passage through the tube operated at a temperature gradient extending from 1000° C. at the ends of the tube and a temperature of approximately 1260° C. at the center zone wherein a predominance of the polycrystalline garnet reaction takes place. Flow of the gaseous reactants through the reaction tube was obtained by means of a vacuum pump connected to the discharge end of the reaction tube, which pump was operated at a reduced pressure of approximately 5 millimeters of mercury vacuum. Under these conditions, a deposit of 316 milligrams total weight occurred after approximately 45 minutes of operation for an efficiency of 16% with the homogenous solid garnet phase occurring predominantly in the reaction zone of the tube. The garnet phase of the deposit consisted of a black patch approximately 3 mils in thickness comprising individual garnet crystals of approximately 3 mils in diameter although certain of the crystals were as large as 40 mils in diameter. The polycrystalline garnet deposit was examined microscopically and found to have no large voids extending through the thickness of the film. There was also no visual indication of crystals other than yttrium iron garnet in the film.

Conventional X-ray diffraction analysis of the yttrium-iron garnet prepared in the above manner was made for comparison with the diffraction pattern of a single yttrium-iron garnet crystal received from a commercial source. The X-ray diffraction lines identified for both materials are listed in Table 1 below along with the relative intensity for the individual $d$ spacings.

*Table 1*

| Standard Crystal | | Polycrystalline Deposit | |
|---|---|---|---|
| $d$ Spacings | Intensity | $d$ Spacings | Intensity |
| 3.09 | 23 | 3.12 | 9 |
| 2.77 | 56 | 2.78 | 14 |
| 2.53 | 20 | 2.54 | 6 |
| 2.26 | 5 | | |
| 2.0 | 6 | | |
| 1.79 | 7 | | |
| 1.72 | 18 | | |
| 1.65 | 23 | 1.65 | 6 |
| 1.55 | 14 | | |
| 1.38 | 6 | | |
| 1.35 | 8 | | |

From the above results, it is noted that garnet is the predominant phase in the polycrystalline deposit since diffraction was exhibited in the material at the same major $d$ spacings for the single crystal.

EXAMPLE 2

An yttrium-iron garnet deposit was obtained by the same general method described in the preceding example under different operating conditions. In the present example, the flow rate for ferric chloride was maintained at approximately 3.53 grams per hour with an yttrium chloride flow rate of approximately 0.96 gram per hour in an oxygen/argon gas mixture flowing at individual rates of 200 standard milliliters per minute and 530 standard milliliters per minute, respectively. A black homogeneous patch of yttrium-iron garnet was deposited in the central zone of the reaction tube. The total deposit weighed 399 milligrams after approximately one hour deposition for a total deposition efficiency of around 17%. The X-ray diffraction pattern for the polycrystalline deposit is listed in Table 2 below.

*Table 2*

| $d$ Spacings | Intensity |
|---|---|
| 3.09 | 5 |
| 2.76 | 15 |
| 2.53 | 6 |
| 1.71 | 4 |
| 1.65 | 4 |

A comparison of the above results with the X-ray diffraction pattern for the single crystal again identifies the deposit as yttrium-iron garnet by reason of correspondence in the major $d$ spacings. The absence of other $d$ spacings for both of the materials appearing in Examples 1 and 2 is further indicative of product homogeneity which does not include detectable second phases.

EXAMPLE 3

A deposit of yttrium-iron garnet was prepared according to the general method described in the preceding examples under still different reaction conditions involving both lower reaction temperatures as well as total flow rates and ratios of the reactants. For the present example the reaction temperature was maintained at 1200° C. in the central reaction zone of the tube and at approximately 1000° C. for the end portions of the tube. A reaction mixture flow rate comprising approximately 2.59 grams per hour ferric chloride, 0.52 gram yttrium chloride suspended in a carrier gas stream comprising 200 standard milliliters per minute oxygen and 530 standard milliliters per minute argon was converted to yttrium-iron garnet merely by passage through the reaction tube at the operating temperatures indicated. A total deposit weighing 284 milligrams was obtained after approximately 40 minutes operation at the specified conditions for a deposition efficiency of 18% based on the weight of halide reactants employed. The crystalline characteristics of the deposit formed during the process were substantially comparable to that obtained for the products of the previous examples.

EXAMPLE 4

To illustrate the preparation of rare earth-iron garnet polycrystalline deposits by direct vapor phase conversion of volatile rare earth and iron halides to the respective oxides with coprecipitation of the oxides to form the garnet crystalline structure by a modified process of the general method hereinbefore described, an yttrium-iron garnet deposit was obtained by heating separately introduced gas streams of the reactants to the reaction chamber. The separation of reactants before introduction into the reaction zone of the reaction tube minimizes occurrence of competing side reactions involving the reactants thereby increasing the efficiency of depositing the rare earth-iron garnet product. Accordingly, the general method hereinbefore employed was modified by introducing into the reaction tube a gaseous mixture comprising 2.32 grams ferric chloride per hour with 0.18 gram yttrium chloride per hour suspended in an oxygen-free carrier gas of argon flowing at the rate of approximately 530 standard milliliters per minute. A separate oxygen stream was introduced separately into the heated reaction tube at a rate of approximately 200 standard milliliters per minute. The separate gas streams were mixed in the reaction zone operated at approximately 1200° C. which resulted in direct conversion of the halides to the respective oxides followed by coprecipitation of the oxides in said reaction zone to form the yttrium-iron garnet deposit directly. The product produced during the process was substantially comparable to that obtained in the preceding examples.

EXAMPLE 5

An even further separation of reactants before introduction into the reaction zone of the tube promotes greater conversion of the reactants to a polycrystalline iron garnet phase. In illustration, separate streams comprising 2.32 grams per hour ferric chloride suspended in anhydrous argon, 0.72 gram per hour yttrium chloride also suspended in anhydrous argon, and 200 standard milliliters per minute of oxygen were conducted individually into the reaction zone of the tube being operated at approximately 1200° C. Mixing of the reactants at the central zone of the tube together with conversion of the halides to oxides and coprecipitation of the oxides produced a polycrystalline yttrium-iron deposit having the characteristics hereinbefore described at greater efficiencies than generally obtained from a mixture of the reactants.

EXAMPLE 6

An approximately 0.010 in. diameter platinum wire was coated with an adherent yttrium-iron garnet film by means of still a different process than described in the preceding examples. In the process, a higher degree of control in introducing the ferric chloride vapors into the evacuated reaction tube was obtained by passing chlorine over a solid iron deposit in a separate furnace and thereafter conducting the ferric chloride vapors as produced into the tube. A larger proportion of homogeneous yttrium-iron garnet phase was produced in the final coating as a result of the modified procedure. While the specific example illustrated employs elemental iron to generate the iron halide, it will be understood that other halogenatable iron materials may also be used, including iron nitride, iron carbide, iron alloys, and even iron oxide.

Accordingly, a mixed gas stream of chloride and argon flowing at individual rates of 16–17 standard millimeters per minute and 100 standard millimeters per minute, respectively, were passed over heated analytical grade iron wire and the resultant iron chloride vapors conducted in the stream to the reaction tube. A separate stream of heated oxygen flowing at 200 standard millimeters per minute and carrying 0.2 gram per hour yttrium chloride was separately introduced into the reaction tube concurrently with the iron chloride-containing gas stream. The halide vapors were mixed and converted in the usual fashion in the reaction tube operating at 1200° C. under 4 millimeters mercury vacuum. The converted vapors were passed over the platinum wire lying in the central zone of the tube and coprecipitation of the oxide occurred building a coating on the exposed wire surface. After 55 minutes' operation, a total deposit weighing 76 milligrams was obtained which contained much larger zones of yttrium-iron garnet phase than produced in the previous examples.

Ferromagnetic reasonance absorption of the coating above prepared was measured on the wire sample by conventional microwave technique in a cavity resonator at X band frequencies. The actual measurement technique is well known and is more fully described in "Ferrites," by J. Smit and H. P. J. Wijn, John Wiley and Sons (1959), Chapter 7. A D.C. field was generated parallel to the wire located centrally in the cavity perpendicular to an A.C. microwave field being concurrently generated perpendicular to the wire axis. A single resonance absorption peak of 130 gauss width was obtained at a D.C. field strength of approximately 2450 gauss. The absorption corresponds in location within 200 gauss of the expected theoretical value for thin films of yttrium-iron garnet.

The range in ferromagnetic resonance of polycrystalline rare earth-iron garnet deposits obtained by the above methods has been measured and further serves to identify the products of the invention. Measurements performed on other thin supported films of up to 3 mils thickness and supported on the wall of a ceramic reaction tube exhibited narrow single resonance lines approximately 80–175 gauss in width in a D.C. field parallel to the ceramic cylinder axis. The single resonance lines occurring at the location for yttrium-iron garnet are indicative of uniform thin film geometry. While such relative width of the resonance lines may be wider than for an ideally shaped single crystal of yttrium-iron garnet, the discrepancy may be due in large part to size differences in the crystals present in the deposits of the invention. More particularly, while the individual crystals in the deposits are predominantly very small crystallites, ranging in diameter from about 5 to 15 microns, there is generally present a few much larger diameter crystals in the deposited film ranging in size from 50–100 micron diameter which can spread the width of resonance lines. Additionally, since the measurements were made on films supported on a curvilinear cylinder wall, some line spread may be due to substrate curvature so that the line width measurements given above are perhaps only indicative of maximum line spread in the thin film products of the invention.

Polycrystalline rare earth-iron garnet deposits having the desirable properties described can be prepared by converting oxidizable halides of certain metals to the respective oxides in the vapor phase and thereafter coprecipitating the oxides to form a synthetic garnet material which can be represented generally by the structural formula $$M_3Fe_2(FeO_4)_3$$

where O is oxygen and M is a trivalent metal selected from the class of yttrium and one of the rare earth elements of atomic number between 62–71 including mixtures of these rare earth elements with each other and with yttrium. Where M is one of the rare earths herein specified, the materials are commonly known as "rare earth-iron garnets" and where M is yttrium the material is termed "yttrium-iron garnet." The synthetic material herein described is termed "garnet" by reason of having the same complex cubic structure as mineral garnets, such as grossularite, $Ca_3Al_2(SiO_4)_3$, but differs from the mineral form by absence of divalent and quadrivalent metal ions of the mineral, having trivalent atoms replacing them in the lattice. The yttrium ion garnet products of the invention are preferred for ferromagnetic applications because of the relatively narrow line width of ferromagnetic resonance absorption together with other desirable properties exhibited by this material.

The products of the invention are deemed obtainable directly by conversion of an iron halide and a rear earth halide of the type described to the respective oxides with subsequent coprecipitation of the oxides to form the garnet material. It is necessary to use the halides of both materials for important but different reasons. Necessity for an iron halide reactant arises from the relatively higher decomposition temperature of such material compared with other volatile iron compounds such as dinitrosyl iodide so as to minimize premature deposition of iron oxide alone. A rare earth halide is employed in the reaction primarily for its reactivity with iron oxide by metathesis to re-form iron chloride vapor at the conditions in the reaction chamber thereby exhibiting a corrective effect to excess iron oxide deposition in the reaction zone of said chamber. More particularly, since some free rare earth halide is present in the atmosphere of the reaction zone during preparation of the garnet by codeposition of the oxides, the free rare earth halide is available for reaction with iron oxide which tends to deposit in excess in the reaction zone for adjustment of the deposited composition to correspond to the garnet material. By such mechanism, the ratio of the halides introduced into the system for reaction according to the invention may be varied from about a ratio of 2 parts iron halide to 1 part rare earth halide up to 13 parts iron halide to 1 part rare earth halide without significant detrimental effect. In this range, a ratio of 2 parts of iron halide to 1 part rare earth halide to 3 parts iron halide to 1 part rare earth halide is preferred for higher deposition yields. The over-all range of reactant ratio indicated insures at least a theoretical 5:3 ratio of $Fe_2O_3$ to $M_2O_3$ or stoichiometric excess of $Fe_2O_3$ in the reaction zone during garnet formation.

The temperature conditions required for garnet deposition according to the invention are surprisingly lenient considering the possible detrimental effects of competing side reactions together with varying rates of conversion for the individual reactants. The homogeneous garnet phase has been observed to occur in reactions taking place from 1150 to 1300° C. with reaction temperatures in the range 1200-1250° C. producing a higher yield of garnet phase for the other reaction conditions employed in the above examples. Operation of the reaction at temperatures below 800–900° C. is deemed unsatisfactory since only imperfect garnet crystals are produced as a predominantly amorphous deposit of low density in this temperature range. The maximum temperature of the reaction is deemed to be the sintering temperature of the particular rare earth-iron garnet composition deposited because of the relatively poorer ferromagnetic properties of a sintered composition compared to the products of the invention. Specifically, the line widths of ferromagnetic resonance absorption for a sintered composition are often greater than 1000 gauss compared to the relatively narrow resonance lines noted for the products of the invention.

The operating pressures for garnet formation according to the invention are those necessary to minimize substantial solid formation of the oxides in the gas phase. It thus appears that there is a critical supersaturation pressure above which the solid oxides undesirably form in the gas phase with the critical supersaturation being dependent upon the concentration of reactants in products in the gas stream as well as the particular operating pressure. Operation of the process under reduced pressure or vacuum tends to depress supersaturation by reduction of the reaction rate. Additionally, the concentration levels for saturation will increase with temperature and therefore, relatively high reaction temperatures in the reaction chamber can be expected to depress supersaturation by increasing the saturation concentration for the system. Finally, the upward ranging temperature gradient in the reaction chamber employed in the preceding examples is also a condition reasonably expected to maintain a reduced level of supersaturation. It will be obvious, therefore, that the optimum operating pressure for the reaction will involve a combination of factors including concentrations, temperature, and even temperature gradients so that it is merely necessary to regulate the pressure in the reaction chamber along with such other associated factors so as to prevent a large formation of solids in the gas phase. Bulk formation of solid oxides in the gas phase will not terminate the reaction since coprecipitation of these solids can produce the desired final products but supersaturation tends to lower uniformity of product composition by introducing second phases in the product along with reducing product density and crystallinity. Secondary effects of supersaturation and formation of solids in the gas phase which disrupt the preparation process as practiced in the above preferred examples are also noted. Conduction of the reaction in the relatively small diameter reaction tube as described in the examples at a reduced pressure of approximately 5 millimeters of mercury vacuum produce no significant solids formation in the gas phase. When the operating pressure was elevated to about 15 millimeters of mercury vacuum, powdery deposits formed in the tube to an extent which greatly plugged the internal tube opening.

From the foregoing description, it will be apparent that a novel method for the preparation of polycrystalline homogeneous rare earth-iron garnet compositions has been provided together with novel products obtained thereby which are particularly adapted for ferromagnetic applications. It is not intended to limit the invention to the preferred embodiments above shown, however, since it will be obvious to those skilled in the art that certain modifications of the present teaching can be made without departing from the true spirit and scope of the invention. For example, since it has been shown that ferromagnetic iron garnet deposits can be adhered directly to such diverse substrates as ceramic tubes and metal wire, it will be apparent that like deposits can also be prepared on other thermally durable substrates including glass plates, metal sheets, and the like. Likewise, while the conversion reaction has been only illustrated with oxygen as the oxygen-containing gas, it is contemplated that other oxygen-containing gases such as air, nitrous oxide, nitrogen dioxide, carbon monoxide, and carbon dioxide are also utilizible.

What I claim as new and desire to secure by Letters Patent of the United States is:

1. A process for preparing a homogeneous solid phase of rare earth-iron garnet which comprises converting rare earth halide and iron halide vapors in an oxygen-containing atmosphere to the oxide vapors, and coprecipitating the oxide vapors onto a substrate at elevated temperatures extending from approximately 800° C. up to the sintering temperature of the coprecipitate.

2. A process for preparing a homogeneous solid phase of rare earth-iron garnet which comprises introducing rare earth halide and iron halide vapors into an oxygen-containing atmosphere, heating the halide vapors with mixing to convert the vapors to oxide vapors, and coprecipitating the oxide vapors onto a substrate at elevated temperatures extending from approximately 800° C. up to the sintering temperature of the coprecipitate.

3. A process for preparing a homogeneous solid phase of rare earth-iron garnet which comprises separately introducing a gaseous mixture of a rare earth halide with an iron halide and an oxygen-containing gas into a heated reaction chamber, heating the gases with mixing to convert both halides to the respective oxides, and coprecipitating the oxides on a heated surface in contact with the gases at elevated temperatures extending from approximately 800° C. up to the sintering temperature of the coprecipitate.

4. A process for preparing a homogeneous solid phase of rare earth-iron garnet which comprises separately introducing a gaseous rare earth halide, a gaseous iron halide and an oxygen-containing gas into a heated reaction chamber, heating the gases with mixing to convert both halides to the respective oxides and coprecipitating the oxides on a heated surface in contact with the gases at elevated temperatures extending from approximately 800° C. up to the sintering temperature of the coprecipitate.

5. A process for preparing a homogeneous solid phase of rare earth-iron garnet which comprises continuously introducing a rare earth halide vapor, an iron halide vapor, and an oxygen-containing atmosphere into a reaction chamber having enclosed walls of an opening that permits through-passage for gas exit, maintaining the flow of vapors to the reaction chamber below supersaturation, heating the halide vapors with mixing in the reaction chamber to convert the halide vapors to oxide vapors and coprecipitating the oxide vapors on the walls of the reaction chamber at elevated temperatures extending from approximately 800° C. up to the sintering temperature of the coprecipitate.

6. A process for preparing a homogeneous solid phase of rare earth-iron garnet which comprises continuously introducing a rare earth halide vapor, an iron halide vapor, and an oxygen-containing atmosphere into a reaction chamber having enclosing walls with an opening that allows through-passage for gas exit, maintaining the flow of vapors to the reaction chamber below supersaturation and in relative proportions so as to provide a stoichiometric excess of iron halide to rare earth halide, heating the halide vapors with mixing in the reaction chamber to convert the halide vapors to oxide vapors and coprecipitating the oxide vapors on the walls of the reaction chamber at elevated temperatures extending from approximately 800° C. up to the sintering temperature of the coprecipitate.

7. A process for preparing a homogeneous solid phase of rare earth-iron garnet which comprises passing a stream of halogen vapor in contact with a solid halogenatable iron material at elevated temperatures, reacting the halogen vapor by contact with the solid iron material to produce iron halide vapors, introducing the halide vapors as formed into a reaction chamber having enclosing walls with an opening that allows through-passage for gas exit, concurrently introducing rare earth halide vapors and an oxygen-containing gas into the reaction chamber, heating the halide vapors with mixing in the reaction chamber to convert the halide vapors to oxide vapors, and coprecipitating the oxide vapors on the walls of the reaction chamber at elevated temperatures extending from approximately 800° C. up to the sintering temperature of the coprecipitate.

8. A process for preparing a homogeneous solid phase of rare earth-iron garnet which comprises introducing anhydrous iron halide and rare earth halide vapors continuously into a heated open-end tube having an upward ranging temperature gradient in the reaction tube along the direction of gas flow, mixing and converting the halide vapors during passage through the tube in an oxygen-containing atmosphere to oxide vapors, and coprecipitating the oxide vapors on the tube walls being maintained at elevated temperatures extending from approximately 800° C. up to the sintering temperature of the coprecipitate.

9. A process for preparing a homogeneous solid phase of rare earth-iron garnet which comprises introducing anhydrous iron halide and rare earth halide vapors continuously into a heated open-end tube having an upward ranging temperature gradient in the reaction tube along the direction of gas flow, mixing and converting the halide vapors during passage through the tube in an oxygen-containing atmosphere under reduced pressure to oxide vapors, and coprecipitating the oxide vapor on the tube walls being maintained at elevated temperatures extending from approximately 800° C. up to the sintering temperature of the coprecipitate.

10. A homogeneous polycrystalline rare earth-iron garnet phase characterized by ferromagnetic resonance absorption with individual absorption lines 80–175 gauss in width so as to exhibit a crystallographic structure and ferromagnetic properties approximating that for a single crystal of the rare earth-iron garnet.

11. A ferromagnetic element which comprises a thin film of small individual discrete yttrium-iron garnet crystals adhered to a support, the film being characterized by ferromagnetic resonance absorption with individual absorption lines 80–175 gauss in width so as to exhibit a crystallographic structure and ferromagnetic properties approximating that for a single crystal of the yttrium-iron garnet.

References Cited in the file of this patent

UNITED STATES PATENTS

| | | |
|---|---|---|
| 2,898,496 | Clark | Aug. 4, 1959 |
| 2,938,183 | Dillon | May 24, 1960 |
| 2,957,827 | Nielsen | Oct. 25, 1960 |
| 2,990,295 | Breining et al. | June 27, 1961 |
| 2,996,418 | Bleil | Aug. 15, 1961 |
| 3,003,966 | Van Uitert | Oct. 10, 1961 |
| 3,006,855 | Geller | Oct. 31, 1961 |
| 3,019,137 | Hanlet | Jan. 30, 1962 |
| 3,038,861 | Van Uitert | June 12, 1962 |
| 3,039,963 | MacCallum | June 19, 1962 |
| 3,050,407 | Nielsen | Aug. 21, 1962 |
| 3,051,656 | Kramarsky | Aug. 28, 1962 |
| 3,062,746 | MacCallum et al. | Nov. 6, 1962 |

OTHER REFERENCES

Van Uitert et al.: Jur. Am. Ceramic Soc., October 1959, page 471.